UNITED STATES PATENT OFFICE.

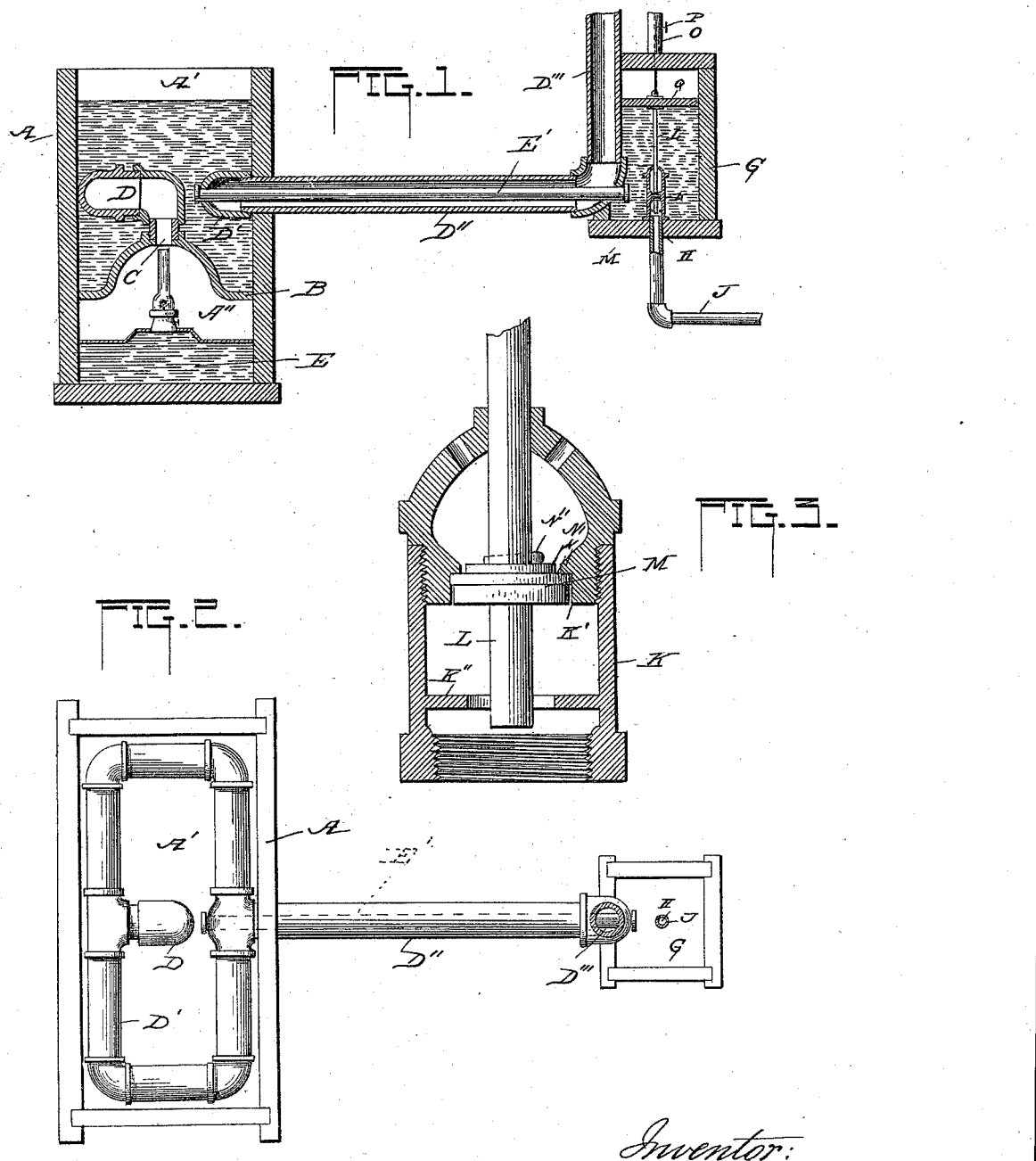

ISAAC J. HARTFORD, OF KIRKSVILLE, MISSOURI.

STOCK-WATERING TANK.

SPECIFICATION forming part of Letters Patent No. 570,254, dated October 27, 1896.

Application filed December 19, 1895. Serial No. 572,650. (No model.)

*To all whom it may concern:*

Be it known that I, ISAAC J. HARTFORD, a citizen of the United States, residing at Kirksville, in the county of Adair and State of Missouri, have invented certain new and useful Improvements in Stock-Watering Tanks; and I do hereby declare the following to be a full, clear, and exact description of the invention, such as will enable others skilled in the art to which it appertains to make and use the same.

My invention relates to improvements in stock-watering apparatus; and the main object of my invention is the provision of an apparatus which will prevent the water from freezing when exposed to the intense cold weather.

Another object of my invention is the provision of a stock-watering apparatus which will be of simple, durable, and inexpensive construction and thus make a practical and useful apparatus.

To attain the desired objects, the invention consists of a stock-watering apparatus embodying novel features of construction and combination of parts, substantially as disclosed herein.

Figure 1 represents a vertical central sectional view of my improved apparatus. Fig. 2 represents a plan view thereof; and Fig. 3 represents a detail sectional view, on an enlarged scale, of the inlet-pipe valve.

In the drawings, A designates the watering tank or trough, which is divided into two compartments A' and A'' by means of the wall B, which is provided with an opening C, in which is secured the elbow D, leading to the heat-circulating pipes D', which pass around the inside of the tank in the upper or water compartment A' and pass out by the horizontal pipe D'', which terminates in the vertical escape-pipe D'''. In the lower compartment A'' of the tank I place a lamp or other suitable heater E, and by this means it will be seen that the heat passes through the pipes and heats the body of the water and passes out through the exit-pipe and prevents the water from freezing.

Arranged in the horizontal branch D'' is the feed-pipe E', which leads to the tank from the supply-tank G, which is arranged contiguous to the heat-exit pipe, and the supply water is prevented from freezing thereby.

The supply-tank is provided with an inlet H, with which communicates the supply-pipe J, and to the inlet end of the supply-pipe is connected the valve-casing K, having the valve-seat K' and the guiding-web K'', and in an opening of said web fits the lower end of the valve-stem L, which carries the valve M, which consists of the disks N and the washer or gasket N', interposed between the disks and held in place by means of the key or fastening N''.

The stem of the valve extends up and is connected at its upper end to the under face of the float Q. To an eye on the upper face of the float is connected the lower end of a rod which extends up through a guide or tube O, having a set-screw P for engaging and holding the said rod. The purpose of this rod and screw is to hold the valve open or closed, as will be understood.

In operation the water passes into the supply-tank and from thence into the feed or watering trough or tank, and when the desired amount of water is in the tank the float may be retained by means of the binding-screw engaging the stem and the heater will keep the body of water from freezing under all circumstances.

The tank can be quickly filled when desired, as it is evident that the float need not be retained by the set-screw. I provide a tank which is especially desirable for use in cold or warm weather and by reason of its simplicity and efficiency is a thoroughly practical apparatus.

I claim—

1. The herein-described stock-watering apparatus, consisting of the watering tank or trough having the division-wall, the heater below said wall, the heat-circulating pipes leading from the wall, the feed-pipe in one branch of the pipe, the supply-tank adjacent to the heat-pipe, and the inlet-pipe leading to the supply-tank and having a valve.

2. The herein-described stock-watering apparatus, consisting of the watering-tank, the horizontal division-wall in said tank having the central opening, the heater below the opening, the heat-circulating pipes leading from the opening of the wall around the tank, the feed-pipe leading to the tank and inclosing the heating-pipes, the supply-tank, the supply-pipe leading to said tank, the casing connected to said pipe and having a valve seat and guide, the valve in said casing having a cushion or packing, the stem connected to the valve having its lower end guided in the casing, the float connected to the upper end of the stem, the rod leading from the upper face of the float, the tube in which said rod is arranged and the set-screw for engaging said rod.

In testimony whereof I affix my signature in presence of two witnesses.

ISAAC J. HARTFORD.

Witnesses:
Q. N. TRENT,
O. W. DAVIS.